UNITED STATES PATENT OFFICE 2,593,576

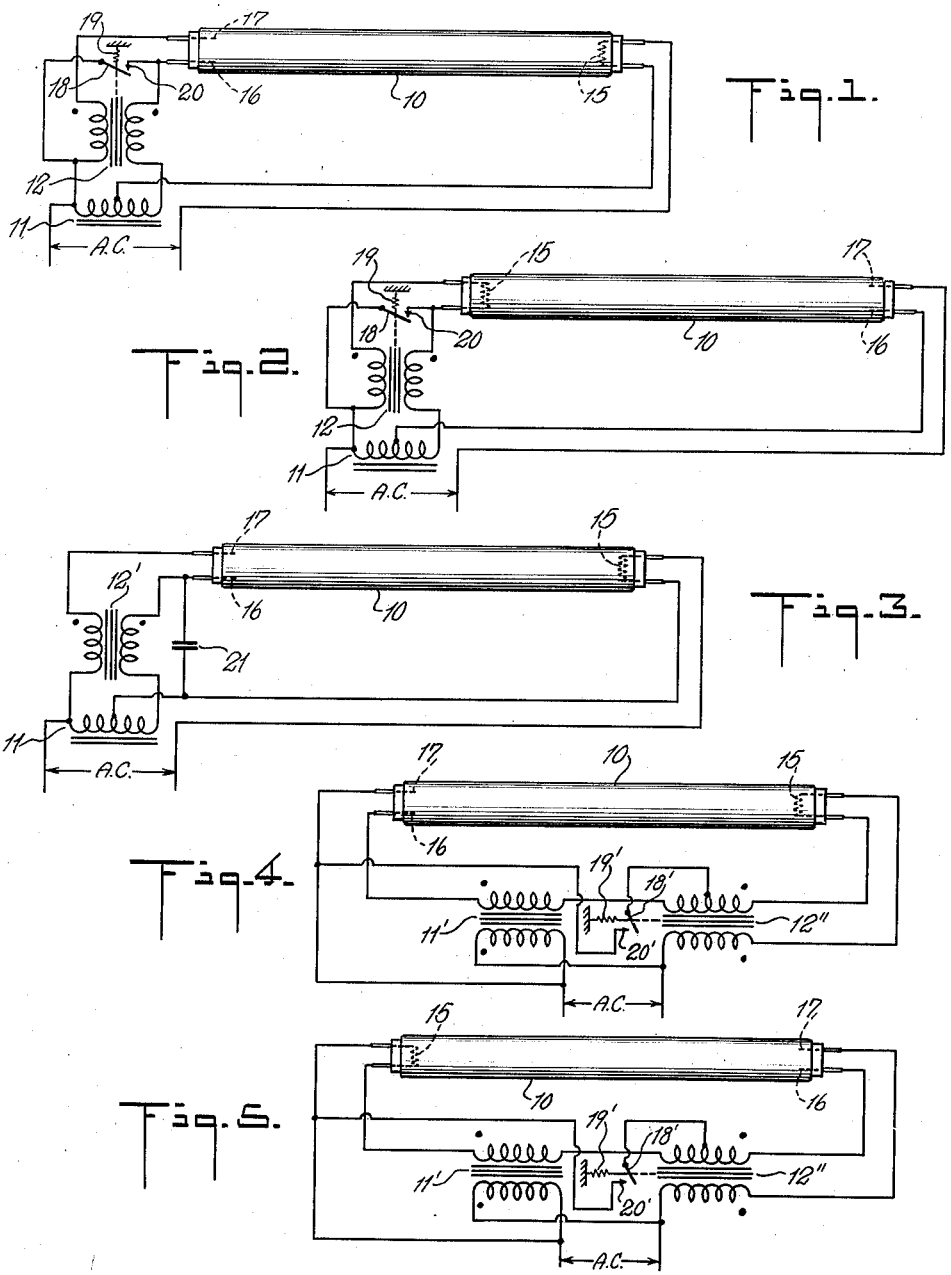

FLUORESCENT LAMP CIRCUIT

Luis G. Legorreta, Eduardo Posada, and Fernando Camarena, Mexico City, Mexico, assignors to Electrol S. A., Mexico City, Mexico, a Mexican corporation Application May 28, 1949, Serial No. 96,028
In Mexico October 16, 1948

3 Claims. (Cl. 315—266)

This invention relates to fluorescent lamp circuits and more particularly to such circuits which eliminate initial or starting heating of the lamp filament and produce illumination free from any stroboscopic effect.

Fluorescent lamps when operated from an A. C. potential source as taught by the prior art require having their filaments initially heated by an external source to a temperature sufficient to cause them to glow in order to start the flow of current through the lamp. After the current flow is initiated, this heating of the lamp filament may be discontinued. Whether this external source heating is discontinued or not, a second problem then arises, in that due to the reversal of the current occurring at each half-cycle of the A. C. potential during operation, the use of individual lamps connected conventionally to the potential supply results in a stroboscopic illumination effect which is tiring to the human eye and causes eyestrain. The prior art solved this second problem partially by operating a plurality of lamps spaced closely adjacent one another and by arranging the circuit connections to the end sockets of these lamps so that opposite ends of alternate lamps were phased similarly. This resulted in roughly the same amount of illumination at all times adjacent either end of any two adjacent lamps, and the resultant illumination from the plurality of lamps could be further "smoothed" by introducing a ground glass in the path of the illumination.

Briefly, our invention provides a fluorescent lamp circuit which both eliminates the initial heating of the fluorescent lamp filament and produces illumination without stroboscopic effect from an individual fluorescent lamp by causing the current to flow uni-directionally of the lamp from the filament or cathode alternately to two anodes provided at the other end of the lamp. The current passing through the tube also passes alternately through two inductance windings wound on a common core, which limit the value of the current and smooth out the rectified current fluctuations. In addition these inductance windings may be utilized at starting to produce, by transformer action, an additional instantaneous voltage, which when added to the applied A. C. voltage is greater than the "breakdown" voltage of the lamp and causes it to begin to operate as a light source.

Our invention will be more apparent from the following description when taken in connection with the accompanying drawings, in which:

Fig. 1 shows one embodiment of this invention with the fluorescent lamp connected properly;

Fig. 2 shows the circuit of Fig 1 with a fluorescent lamp connected in the improper or inverted position;

Fig. 3 shows a second embodiment of this invention, which differs from the embodiment of Fig. 1 in the substitution of a condenser for initiating the starting of the lamp operation;

Fig. 4 shows a third embodiment with a fluorescent lamp inserted in the circuit in one operative position;

Fig. 5 shows the embodiment of Fig. 4 with the fluorescent lamp inserted in the other or inverted operative position.

In Fig. 1 is shown a fluorescent lamp 10 connected in circuit with an auto-transformer 11 and a combined relay-inductance 12. Fluorescent lamp 10 has a filament-type cathode 15 at one end and two adjacent anodes 16 and 17 at the other end thereof. Combined relay-inductance 12 has two similar windings, phased as indicated by the dots adjacent one end of each as shown in the drawing, and both wound on a common core. A relay armature 18 is biased normally, as by means of spring 19, to engage fixed contact 20 in the absence of a current flow through the windings of the inductance. When a current does flow through either or both windings of combined relay-inductance 12, the magnetic flux thereby produced attracts the armature 18 and disengages its contact from fixed contact 20. One end of the winding of auto-transformer 11 is connected through one winding of inductance 12 to anode 16, and the other end of the winding of auto-transformer 11 is connected through the other winding of inductance 12 to anode 17 and through armature 18 and fixed contact 20 to anode 16. The tap of auto-transformer 11 is connected to one terminal of filament 15, and the A. C. potential supply is connected to the other terminal of filament 15 and that end of the winding of auto-transformer 11 which is connected to armature 18. Preferably both windings of combined relay-inductance 12 have the same number of turns or, in other words, a turns ratio of 1:1, and the tap of auto-transformer 11 is preferably positioned at the center of its winding or, in other words, is a center-tap. The impedance of filament 15 is small with respect to the impedance of that portion of the winding of auto-transformer 11 across which the A. C. potential is applied, and hence there is no appreciable voltage drop across filament 15. Thus, filament 15 is not heated initially for starting or caused to glow, and operates as a cold cathode rather than a thermionic one. The generally accepted theory is believed to be that when the extra starting voltage is applied between the cathode and the anodes, a hot point of emission is produced at some point on the cathode, which causes the latter to emit electrons and the lamp hence to begin to emit visible light.

Initially, before the A. C. potential is applied to this circuit, as well as at the instant when the potential is applied, armature 18 and fixed contact 20 are engaged due to the biasing action of spring 19. At the instant of applying the A. C. potential, a voltage equal to twice the supply voltage is produced across the auto-transformer winding, and this voltage is applied to the right-hand coil of inductance 12 momentarily due to the completion of the circuit through armature 18 and fixed contact 20. This voltage applied across the right-hand winding of inductance 12 induces an equal and correspondingly-phased voltage in the left-hand coil of inductance 12. During the half cycle when the left-hand end of auto-transformer 11 is positive with respect to its center-tap, the resultant voltage induced in the left-hand coil of inductance 12 is of such polarity that it adds to, rather than subtracts from, the voltage produced between the auto-transformer tap and the left-hand end of its coil or winding. Thus, at this moment, there is applied between the filament or cathode 15 and the anode 17 a voltage equal to approximately three times the supply potential and this, being greater than the breakdown potential of the gas in the fluorescent lamp 10, causes the lamp to light. The flow of current through the inductance 12 at the same time causes armature 18 to disengage from contact 20, and the fluorescent lamp 10 then continues to operate with a uni-directional current flow along its length from filament 15 to anodes 16 and 17 alternatively, depending upon which end of auto-transformer 11 is positive with respect to the tap thereof at any instant. Should fluorescent lamp 10 fail to pass current or start before armature 18 disengages from fixed contact 20 due to the momentary current flowing in the right-hand coil of inductance 12 because of the voltage applied across it from the entire winding of auto-transformer 11, armature 18 will immediately again engage fixed contact 20 and continue this alternate disengagement and engagement until the lamp passes current, whereupon armature 18 will remain disengaged from fixed contact 20, as explained above. Ordinarily, fluorescent lamp 10 will start to operate as soon as an A. C. potential is applied to the circuit as shown, but at times, particularly when the fluorescent lamp 10 is cold, armature 18 may disengage and engage fixed contact 20 several times before the lamp starts to operate.

Fig. 2 shows the same circuit as Fig. 1 but with the fluorescent lamp 10 inverted in its end sockets (not shown) so that the lamp is connected in the circuit as shown. This illustrates an important feature of our circuit of this embodiment, since inversion of the lamp in its sockets cannot cause damage to the circuit or to the lamp inasmuch as there is then no connection to the auto-transformer 11 from the A. C. supply because of the open circuit between anodes 16 and 17. If the lamp 10 is inadvertently inserted in its sockets (not shown) in this position, all that is necessary to start the operation of the lamp is to reverse it end-for-end in the sockets, whereupon it will be in operative position, as in Fig. 1.

In Fig. 3 is shown another embodiment of our invention similar to the embodiment of Fig. 1 but with a condenser 21 utilized for starting purposes and the combined relay-inductance 12 of the embodiment of Fig. 1 replaced by an inductance 12′, which again has two similar windings wound on a common core and phased as before, as indicated by the dots adjacent corresponding ends of the inductance windings. Condenser 21 is connected between anode 16 and the tap on auto-transformer 11. The remaining connections are the same as in the embodiment of Fig. 1, as will be apparent from an inspection of the drawing.

The explanation of the operation of this embodiment is believed to be as follows. When the A. C. potential is applied to this circuit, during the half cycle that the right-hand A. C. supply line is positive the tap of the auto-transformer 11 is also positive, and this charges up the condenser 21 so that its upper plate and the upper end of the right-hand coil of inductance 12′ are positive. During the next half cycle, the left-hand A. C. supply line is positive with respect to the auto-transformer tap. At the same time a voltage is induced in the left-hand coil of inductance 12′, due to the charge remaining upon condenser 21, which adds to the voltage applied between the left-hand end of auto-transformer 11 and the tap thereof so that at this instant a voltage appreciably greater than the supply voltage is applied between the filament 15 and anode 17. This voltage, being greater than the breakdown voltage of the lamp, again starts a uni-directional current flow through the tube. Thereafter, the tube operates as above with the current flowing uni-directionally along the length of the tube between filament 15 and anode 16 or 17, depending upon which end of auto-transformer 11 is positive at any instant.

In Fig. 4 is shown another embodiment of our invention similar to the embodiment of Fig. 1 but with auto-transformer 11 replaced by a transformer 11′ having separate primary and secondary windings with their corresponding ends polarized as indicated by the dots in the drawing. Preferably the primary and secondary of transformer 11′ have a turns ratio of 1:1. Combined relay-inductance 12″ is similar to combined relay-inductance 12 of Fig. 1 except that one of its windings or coils is tapped, preferably at the center thereof. One end of the primary winding of transformer 11′ is connected to one line of the A. C. supply, to anode 17 and to fixed contact 20′. The oppositely-phased end of the secondary winding of transformer 11′ is connected to anode 16, and the other end of this secondary winding is connected to one end of the tapped coil of combined relay-inductance 12″. The correspondingly-phased end of the other coil of inductance 12″ is connected to the other A. C. supply line and to the free end of the primary winding of transformer 11′. The other end of the tapped coil is connected to one terminal of filament 15, and the tap thereof is connected to armature 18. The other terminal of filament 15 is connected to the free end of the other winding or coil of inductance 12″.

Before the A. C. potential is applied to this circuit, as well as at the instant when the potential is applied, armature 18′ engages fixed contact 20′ due to the biasing action of spring 19′. During the first half cycle that the right-hand A. C. supply line is positive, a voltage equal to the supply voltage is applied to the right-hand half of the upper winding or coil of inductance 12", filament 15, and the entire lower coil of inductance 12" in series, with the left-hand end of the lower coil positive with respect to its right-hand end. There is no appreciable voltage drop across filament 15 due to its low impedance, as discussed above, and the resultant current flow in the lower inductance winding or coil and the right-hand half of the upper coil produces in the entire upper coil by transformer action a voltage approximately equal to twice the applied voltage and with the left-hand end of the upper winding positive with respect to the right-hand end. At the same time, there is induced in the secondary winding of transformer 11' a voltage equal to the supply voltage and of such polarity that its left-hand end is also positive with respect to its right-hand end. Thus the voltages induced in the upper coil of inductance 12" and the secondary winding of transformer 11' are additive and applied in circuit between filament 15 and anode 16 in the proper direction to cause a current flow therebetween. This resultant voltage, being approximately equal to three times the supply voltage, is, of course, greater than the breakdown voltage of the lamp 10, and the lamp therefore starts or begins to pass current. This current flows through inductance 12", hence causing armature 18' to disengage from fixed contact 20', and normal operation of the lamp ensues with armature 18' held disengaged from fixed contact 20'.

In Fig. 5 is shown the circuit of Fig. 4 with the position of lamp 10 inverted or, in other words, reversed end-for-end in its sockets (not shown) so that the connections to the anodes 16 and 17 and filament 15 are now as illustrated in this drawing. Tube 10 operates equally well in this position. At starting, when armature 18' is engaging fixed contact 20' and an A. C. potential is applied to the circuit, the voltage induced in the secondary winding of transformer 11' is applied to the left-hand tapped portion of the tapped or upper winding of combined relay-inductance 12", and inductance 12" acts momentarily as a transformer. During the first half cycle that the right-hand supply line is positive with respect to the left-hand line, the left-hand end of the secondary winding of transformer 11' is positive with respect to its right-hand end, and thus a voltage substantially equal to the supply voltage is applied across the left-hand portion of the tapped winding of inductance 12" with the tap of this winding positive with respect to the left-hand end thereof. Because of the phasing of the two windings shown, this induces by transformer action in the other or lower winding of inductance 12" a voltage approximately equal to twice the applied voltage with the right-hand end of the lower winding positive with respect to its left-hand end. Thus, at this instant, a voltage approximately equal to three times the supply voltage is applied between anode 17 and cathode 15 which as above, being greater than the breakdown voltage of the lamp, is sufficient to cause the lamp to start or pass current. Normal operation of the circuit then ensues with armature 18' disengaged from fixed contact 20' due to the current flow through the windings of inductance 12".

Numerous additional applications of the above-disclosed principles will occur to those skilled in the art and no attempt has here been made to exhaust such possibilities. The scope of the invention is defined in the following claims.

We claim:

1. A circuit for operation of gas-filled fluorescent lamps comprising the combination of a gas-filled fluorescent lamp having a filamentary cathode at one end and first and second adjacent anodes at the other end thereof, a transformer having a primary and a secondary winding, said first anode being connected to one end of said primary winding and said second anode being connected to the oppositely-phased end of said secondary winding, and a combined relay-inductance having a first tapped winding and a second winding wound on a common core and including an armature and contacts separated by magnetic attraction between the core and armature when current flows in said relay inductance windings but the armature being biased to bring the contacts into engagement normally in the absence of current flow in said relay inductance windings, said contacts when in engagement connecting the tap of said first tapped winding with said first anode, the free end of said transformer secondary winding being connected to the free and oppositely-phased end of said primary transformer winding through said first tapped winding, said filamentary cathode and said second relay inductance winding in series in the order named, whereby when an A. C. potential is applied to said transformer primary winding said fluorescent lamp is caused to light due to the transformer action of said relay inductance, said engaged contacts thereupon disengage due to the current passing through the windings of said relay inductance, and said fluorescent lamp thereafter remains lighted without stroboscopic effect due to the full-wave rectification of the current flowing through said lamp.

2. A circuit for operation of gas-filled fluorescent lamps comprising the combination of a gas-filled fluorescent lamp having a filamentary cathode at one end and first and second adjacent anodes at the other end thereof, a transformer having a primary and a secondary winding, said filamentary cathode being connected between one end of said primary winding and the oppositely-phased end of said secondary winding, and a combined relay-inductance having a first tapped winding and a second winding wound on a common core and including an armature and contacts separated by magnetic attraction between the core and armature when current flows in said relay inductance windings but the armature being biased to bring the contacts into engagement normally in the absence of current flow in said relay inductance windings, said contacts when in engagement connecting the tap of said first relay inductance winding with said one end of said transformer primary winding, the free end of said transformer primary winding being connected through said second relay inductance winding to said second anode and the free end of said transformer secondary winding being connected through said first tapped relay inductance winding to said first anode, whereby when an A. C. potential is applied to said transformer primary winding said fluorescent lamp is caused to light due to the momentary voltage induced in said second relay inductance winding by the current flowing through the circuit including the tapped portion of said first relay inductance winding, said transformer secondary winding, said filamentary cathode, and said engaged contacts, said engaged contacts thereupon disengage due to the current passing through the windings of said relay inductance, and said fluorescent lamp thereafter remains lighted without stroboscopic effect due to the full-wave rectification of the current flowing through said lamp.

3. A circuit for operation of gas-filled fluorescent lamps comprising the combination of a transformer having a primary and a secondary winding, a combined relay-inductance having a first tapped winding a second winding wound on a common core and including an armature and contacts separated by magnetic attraction between the core and armature when current flows in said relay inductance windings but the armature being biased to bring the contacts into engagement normally in the absence of current flow in said relay inductance windings, the contacts when in engagement connecting the tap of said first relay inductance winding with one end of said transformer primary winding, a connection between the similarly-phased end of said transformer secondary winding and one end of said first tapped relay inductance winding, and a connection between the correspondingly-phased end of said second winding and the other end of said transformer primary winding, whereby when an A. C. potential is applied to said transformer primary winding and a fluorescent lamp, having a filamentary cathode at one end and first and second adjacent anodes at the other end thereof, is connected with the filamentary cathode between the free ends of said relay inductance windings and its anodes to the free end of said transformer secondary winding and the oppositely-phased end of said transformer primary winding, respectively, or with its anodes to the free ends of said relay inductance windings, respectively, and its filamentary cathode between the free end of said transformer secondary winding and the oppositely-phased end of said transformer primary winding, said fluorescent lamp is caused to light due to the transformer action of said relay inductance, said engaged contacts thereupon disengage due to the current passing through the windings of said relay inductance, and said fluorescent lamp thereafter remains lighted without stroboscopic effect due to the full-wave rectification of the current flowing through said lamp.

L. G. LEGORRETA.
E. POSADA.
F. CAMARENA.

REFERENCES CITED

The following references are of record in the file of this patent:

UNITED STATES PATENTS

| Number | Name | Date |
|---|---|---|
| 949,335 | Thomas | Feb. 15, 1910 |
| 1,905,840 | Forney | Apr. 25, 1933 |
| 1,930,083 | Buttolph | Oct. 10, 1933 |
| 1,930,086 | Forney | Oct. 10, 1933 |
| 1,960,349 | Schaberle | May 29, 1934 |
| 1,961,754 | Forney | June 5, 1934 |
| 1,977,254 | Swart | Oct. 16, 1934 |
| 1,984,483 | Kenty | Dec. 18, 1934 |
| 2,170,446 | Edwards | Aug. 22, 1939 |
| 2,170,456 | Lord | Aug. 22, 1939 |
| 2,177,883 | Foulke | Oct. 31, 1939 |
| 2,429,162 | Keiser | Oct. 14, 1947 |
| 2,439,976 | Keiser | Apr. 20, 1948 |
| 2,444,408 | Larime | June 29, 1948 |